May 12, 1931.  W. C. WALKER  1,804,725
HOSE CLAMP
Filed Feb. 27, 1930

INVENTOR
Ward C. Walker
BY Chappell Earl
ATTORNEYS

Patented May 12, 1931

1,804,725

UNITED STATES PATENT OFFICE

WARD C. WALKER, OF BATTLE CREEK, MICHIGAN

HOSE CLAMP

Application filed February 27, 1930. Serial No. 431,746.

The main object of this invention is to provide an improved hose clamp which may be very economically produced and quickly applied, is adjustable, and when applied is very secure.

Objects pertaining to details and economies of my invention will definitely appear from the description to follow. The invention is defined in the claims.

A structure which is a preferred embodiment of my invention is clearly illustrated in the accompanying drawings, in which.

Figure 1:
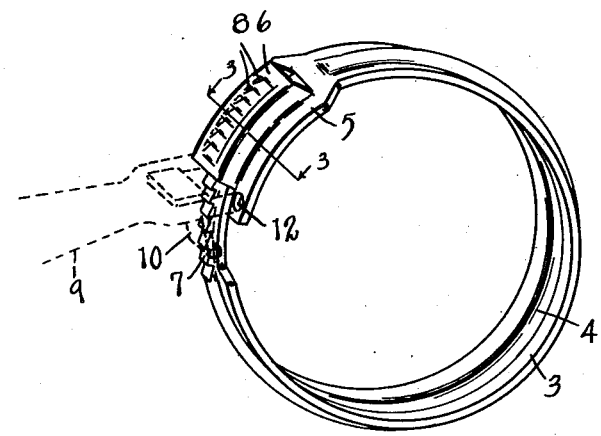
Fig. 1 is a perspective view of my improved hose clamp, an applying tool in operative relation thereto being indicated by dotted lines.
Figure 2:
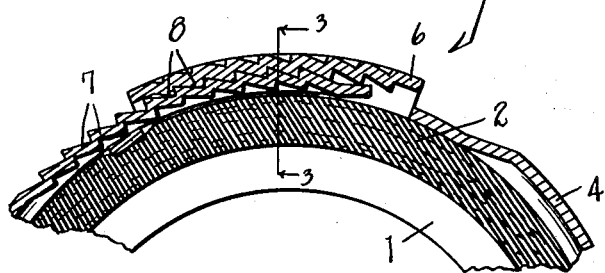
Fig. 2 is a fragmentary longitudinal section of my improved hose connection or coupling in section on line 2—2 of Fig. 3.
Figure 3:
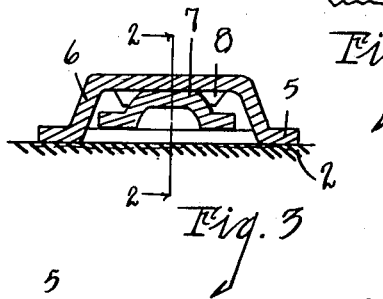
Fig. 3 is a transverse section on line 3—3 of Figs. 1 and 2.
Figure 4:
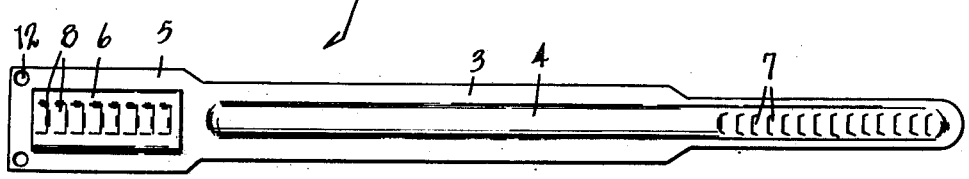
Fig. 4 is a plan view of the coupling extended or flattened.

In the accompanying drawings 1 represents a coupling member and 2 a hose. My improved hose clamp is formed integrally of sheet metal and consists of a band portion 3 having a longitudinal rib 4 struck out therefrom and a head portion 5 having a loop-like keeper 6 adapted to receive the end of the band. This keeper is struck up centrally from the head.

The rib at the end portion of the band has a plurality of indentations formed therein providing ratchet teeth 7, while the keeper has a plurality of indentations formed therein providing the teeth 8 coacting with the teeth 7 of the band, so that when the band is inserted within the keeper the teeth on the head and band engage and provide a very secure connection for the band to the head.

To facilitate applying the head is provided with holes 12 adapted to receive prongs on the tool indicated at 9, the tool having a pawl 10 adapted to engage with the ratchet teeth of the band so that the clamp may be tightened upon the hose with a ratchet-like movement.

My improved clamp may be very economically produced by automatic machinery, no hand labor being required until it is applied to the hose.

Having thus described my invention what I claim as new and desire to secure by Letters Patent is:

1. A hose clamp formed of a single piece of sheet metal consisting of a band portion having a longitudinal rib struck outwardly therefrom, the portion of the rib at the end of the band having a series of indentations therein providing ratchet teeth, and a head portion having a central longitudinal loop-like keeper struck outwardly therefrom and adapted to receive the end of the band, the top of said loop having a series of indentations therein providing a plurality of inwardly directed ratchet teeth on the end of said band.

2. A hose clamp formed of a single piece of sheet metal consisting of a band portion having a central longitudinal rib, and a head portion having a loop-like keeper adapted to receive the end of the band, said rib and loop having a series of indentations therein providing a plurality of coacting ratchet teeth.

In witness whereof I have hereunto set my hand.

WARD C. WALKER.